(12) United States Patent
Riccardi et al.

(10) Patent No.: US 12,289,536 B2
(45) Date of Patent: Apr. 29, 2025

(54) SYSTEMS AND METHODS FOR CAPTURING STABILIZED IMAGES

(71) Applicant: INVENSENSE, INC., San Jose, CA (US)

(72) Inventors: Sebastien Riccardi, Brezins (FR); Pierre Grenet, Grenoble (FR); Jerome Lachaux, Grenoble (FR)

( * ) Notice: Subject to any disclaimer, the term of this patent is extended or adjusted under 35 U.S.C. 154(b) by 169 days.

(21) Appl. No.: 17/992,801

(22) Filed: Nov. 22, 2022

(65) Prior Publication Data

US 2023/0199326 A1 Jun. 22, 2023

Related U.S. Application Data

(60) Provisional application No. 63/290,520, filed on Dec. 16, 2021.

(51) Int. Cl.
*H04N 23/80* (2023.01)
*H04N 23/68* (2023.01)
*H04N 23/81* (2023.01)

(52) U.S. Cl.
CPC ........... *H04N 23/80* (2023.01); *H04N 23/681* (2023.01); *H04N 23/6812* (2023.01); *H04N 23/6815* (2023.01); *H04N 23/81* (2023.01)

(58) Field of Classification Search
CPC .. H04N 23/80; H04N 23/681; H04N 23/6812; H04N 23/6815; H04N 23/81
See application file for complete search history.

(56) References Cited

U.S. PATENT DOCUMENTS

| 10,999,507 | B2 | 5/2021 | Kulik et al. | |
| 2020/0137308 | A1* | 4/2020 | Kulik | H04N 23/6812 |
| 2021/0037186 | A1* | 2/2021 | Kuwahara | H04N 23/6812 |

* cited by examiner

*Primary Examiner* — Lin Ye
*Assistant Examiner* — Fayez A Bhuiyan

(57) ABSTRACT

Systems and methods are disclosed for capturing stabilized images. Motion of the mobile device is determined so that the relative position of the lens and image sensor may be adjusted to compensate for unintended motion. The relative position of the lens and image sensor may be periodically reset in response to a synchronization signal in between capturing images.

22 Claims, 7 Drawing Sheets

SYSTEMS AND METHODS FOR CAPTURING STABILIZED IMAGES

CROSS REFERENCE TO RELATED APPLICATIONS

This application claims priority from and benefit of U.S. Provisional Patent Application Ser. No. 63/290,520, filed Dec. 16, 2021, entitled "OIS LENS COMPENSATION USING IMAGE SYNCHRONIZATION," which is assigned to the assignee hereof and is incorporated by reference in its entirety.

FIELD OF THE PRESENT DISCLOSURE

This disclosure generally relates to techniques for capturing images with a moveable device and more specifically to accommodating greater motion during stabilization.

BACKGROUND

It is increasingly for a portable device to have digital imaging functions. Examples include dedicated imaging devices such as cameras or video recorders as well as portable devices having a greater range of usage including smartphones, tablets, laptops and wearable devices. Further, other moveable devices may also incorporate imaging functionality such as piloted vehicles, vessels and cycles or autonomous devices such as drones and other robotic appliances. However, implementations in a mobile device may be particularly susceptible to degradation in quality caused by motion while the images are being captured. In particular, a camera incorporated into a portable device is often hand held during use and, despite efforts to be still during image recording, shaking may occur. Likewise, mobile devices may undergo intentional motion during usage as in the case of vehicles as well as unintentional motion such as vibration resulting from engines, motors and other powered systems or perturbations resulting from the medium in which the device is travelling, including roadway surfaces, air currents or water conditions.

Since such mobile devices may also be equipped with motion sensing capabilities, techniques exist for using inertial or other sensor data to improve the quality of images captured using the mobile device to address this issue. For example, images being recorded by the mobile device may be stabilized or otherwise compensated using detected motion. In one example, Electronic Image Stabilization (EIS) is a technique where the quality of an image or video is improved using stabilization methods based on image processing techniques. Electronic Image Stabilization is sometimes also referred to as Digital Image Stabilization (DIS) because it only involves digital image processing techniques. One technique that may be applied to a sequence of images is to compare the position of one or more objects in a plurality of images to each other and selectively displace a portion of the image to correct for any movements or vibrations of the device. Similarly, Optical Image Stabilization (OIS) is a technique where the relative position of a lens or other optical element in a device is adjusted with respect to the image sensor to compensate for the sensed motion of the device. As will be appreciated, the adjustment may involve moving either or both the lens and the image sensor and the adjustment may include either or both rotational and translational movement.

EIS techniques conventionally require some degree of cropping to achieve the corrective displacement of an image and cannot provide compensation during capture, preventing any reduction in blur that may result from motion during the exposure time. For these and other reasons, OIS often provides improved performance. However, the intended implementation of OIS involves the capability to produce a relative change in position between the lens and sensor of sufficient magnitude to compensate for the unintended motion experienced by the device. Particularly under certain situations that involve increased motion, such as running or walking with a portable device, conventional approaches to may not provide satisfactory compensation. Attempts to mitigate this effect by increasing the stroke length of the actuators driving components have the undesirable result of increasing the size of the camera module. Further, determining translational motion may be accomplished with accelerometer information but as a result of the double integration necessary to convert from acceleration to distance, suffers from accumulating drift and other errors and that render the technique impracticable after a relatively short period of time.

Accordingly, it would be desirable to provide methods and systems for capturing images with a mobile device able to compensate for greater motion during stabilization. Similarly, it would be desirable to capture images while reducing drift. As detailed below, this disclosure satisfies these and other needs.

SUMMARY

As will be described in detail below, this disclosure includes a method for capturing stabilized images. The method may involve obtaining motion sensor data for the mobile device. Motion of the mobile device may be determined from the obtained sensor data. A relative position of an image sensor and a lens may be adjusted based at least in part on the determined motion. A first image may be captured with the image sensor. A synchronization signal may be sent after the capture of the first image. The relative position of the lens and image sensor may be reset in response to the synchronization signal. Motion of the mobile device may again determined and the relative position of the lens and the image sensor may be adjusted from the reset relative position. A second image may then be captured.

This disclosure also includes a moveable device for capturing a plurality of stabilized images. The device may have an image sensor, a lens, a motion sensor and at least one processor configured to receive data from the motion sensor. The at least one processor may be configured to determine a motion of the mobile device from the motion sensor data and adjust a relative position of the lens and the image sensor based on the determined motion. The at least one processor may also be configured to capture a first image with the image sensor. The relative position of the lens and the image sensor may be reset in response to a synchronization signal sent after capturing the first image. The at least one processor may determine further motion of the mobile device from the motion sensor data and adjust the relative position of the lens and the image sensor from the reset relative position based on the determined further motion so that a second image with the image sensor.

DETAILED DESCRIPTION

Figure 1:
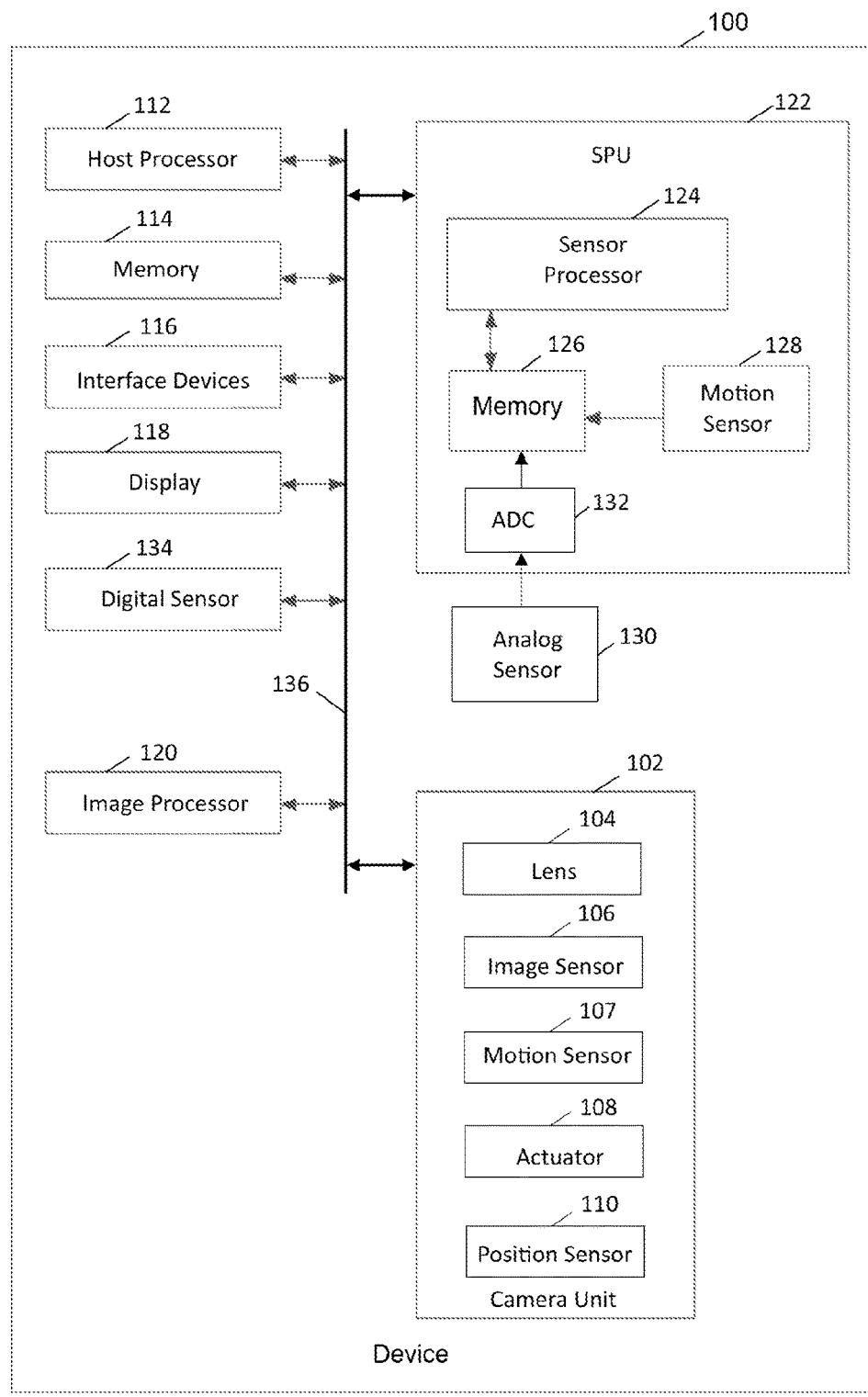
FIG. 1 is a schematic diagram of a device configured to capture a plurality of stabilized captured images according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As noted above, it is increasingly desirable to provide a mobile electronic device with one or more digital cameras. Correspondingly, it is also desirable to utilize sensor data generated by the mobile device to process images captured by such digital cameras. Notably, a mobile device may employ motion sensors as part of the user interface, such as for determining orientation of the device to adjust the display of information accordingly as well as for receiving user input for controlling an application, for navigational purposes, or for a wide variety of other applications. Data from such a sensor or plurality of sensors may be used to determine motion of the mobile device.

To help illustrate these and other aspects of the disclosure, details regarding one embodiment of a mobile electronic device 100 are depicted as high level schematic blocks in FIG. 1. As will be appreciated, device 100 may be implemented as a device or apparatus, such as a handheld device that can be moved in space by a user and its motion and/or orientation in space therefore sensed, such as a multipurpose device like a smartphone or a dedicated handheld camera/video recorder. As noted above, however, device 100 may instead be integrated into a vehicle or vessel used for transportation device or other mobile device whether autonomous or piloted.

Device 100 includes a camera unit 102 configured for capturing images. The camera unit 102 includes at least an optical element, such as, for example, a lens 104, which projects the image onto an image sensor 106. The camera unit 102 may optionally be apt to perform optical image stabilization (OIS). Typically, OIS systems include processing to determine compensatory motion of the lens and/or image sensor in response to sensed motion of the device or part of the device, such as e.g. the camera (body), actuators to provide the compensatory motion in the image sensor or lens, and position sensors to determine whether the actuators have produced the desired movement. The camera unit 102 may include dedicated motion sensors 107 to determine the motion, or may obtain the motion from another module in the device, such as e.g. sensor processing unit (SPU) 122 discussed below. In order to implement OIS, the camera unit includes an actuator 108 for imparting relative movement between lens 104 and image sensor 106 along at least two orthogonal axes. Additionally, a position sensor 110 may be included for determining the position of lens 104 in relation to image sensor 106. Motion sensing may be performed by a general purpose sensor assembly as described below according to techniques disclosed in commonly-owned U.S. Pat. No. 9,628,713, which is hereby incorporated by reference in its entirety. In one aspect, actuator 108 may be implemented using voice coil motors (VCM) and position sensor 110 may be implemented with Hall sensors, although other suitable alternatives may be employed, such as shape memory alloy (SMA) or ball bearing actuators.

Device 100 may also include a host processor 112, memory 114, interface device 116 and display 118. Host processor 112 can be one or more microprocessors, central processing units (CPUs), or other processors which run software programs, which may be stored in memory 114, associated with the functions of device 100. Interface devices 116 can be any of a variety of different devices providing input and/or output to a user, such as audio speakers, buttons, touch screen, joystick, slider, knob, printer, scanner, computer network I/O device, other connected peripherals and the like. Display 118 may be configured to output images viewable by the user and may function as a viewfinder for camera unit 102. Further, the embodiment shown features dedicated image processor 120 for receiving output from image sensor 106 as well as controlling the OIS system, although in other embodiments, any distribution of these functionalities may be provided between host processor 112 and other processing resources of device 100. For example, camera unit 102 may include a processor to analyze the motion sensor input and control the actuators. Image processor 120 or other processing resources may also apply stabilization and/or compression algorithms to the captured images as described below.

Accordingly, multiple layers of software can be provided in memory 114, which may be any combination of computer readable medium such as electronic memory or other storage medium such as hard disk, optical disk, etc., for use with the host processor 112. For example, an operating system layer can be provided for device 100 to control and manage system resources in real time, enable functions of application software and other layers, and interface application programs with other software and functions of device 100. Similarly, different software application programs such as menu navigation software, games, camera function control, image processing or adjusting, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 also includes a general purpose sensor assembly in the form of integrated sensor processing unit SPU 122 featuring sensor processor 124, memory 126 and motion sensor 128. Memory 126 may store algorithms, routines or other instructions for processing data output by motion sensor 128 and/or other sensors as described below using logic or controllers of sensor processor 124, as well as storing raw data and/or motion data output by motion sensor 128 or other sensors. Motion sensor 128 may be one or more sensors for measuring motion of device 100 in space. Depending on the configuration, SPU 122 measures one or more axes of rotation and/or one or more axes of acceleration of the device. In one embodiment, at least some of the motion sensors are inertial sensors, such as rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, the gyroscopes and accelerometers may each have 3 orthogonal axes, such as to measure the motion of the device with 6 degrees of freedom. The signals from the sensors may be combined in a sensor fusion operation performed by sensor processor 124 or other processing resources of device 100 provides a six axis determination of motion. The sensor information may be converted, for example, into an orientation, a change of orientation, a speed of motion, or a change in the speed of motion. The information may be deduced for one or more predefined axes, depending on the requirements of the system. As desired, motion sensor 128 may be implemented using MEMS to be integrated with SPU 122 in a single package. Exemplary details regarding suitable configurations of host processor 112 and SPU 122 may be found in commonly owned U.S. Pat. Nos. 8,250,921 and 8,952,832, which are hereby incorporated by reference in their entirety. Further, SPU 122 may be configured as a sensor hub by aggregating sensor data from additional processing layers as described in commonly owned U.S. Patent Publication No. 2014/14480364, which is also hereby incorporated by reference in its entirety. Suitable implementations for SPU 122 in device 100 include a motion processing unit (MPU™) available from InvenSense, Inc. of San Jose, Calif. Thus, SPU 122 may be configured to provide motion data for purposes independent of camera unit 102, such as to host processor 112 for user interface functions, as well as enabling OIS functionality. Any, or all parts of the MPU may be combined with image processor 120 into a single chip or single package, and may be integrated into the camera unit 102. Any processing or processor needed for the actuator 108 control or position sensor 110 control, may also be included in the same chip or package.

Device 100 may also include other sensors as desired. As shown, analog sensor 130 may provide output to analog to digital converter (ADC) 132, for example within SPU 122. Alternatively or in addition, data output by digital sensor 134 may be communicated over bus 136 to sensor processor 124 or other processing resources in device 100. Analog sensor 130 and digital sensor 134 may provide additional sensor data about the environment surrounding device 100. For example, non-inertial sensors such as one or more pressure sensors, magnetometers, temperature sensors, infrared sensors, ultrasonic sensors, radio frequency sensors, position sensors such as GPS, or other types of sensors can be provided. In one embodiment, data from a magnetometer measuring along three orthogonal axes may be fused with gyroscope and accelerometer data to provide a nine axis determination of motion. Further, a pressure sensor may be used as an indication of altitude for device 100, such that a sensor fusion operation may provide a ten axis determination of motion. Further still, device 100 may have access to other types of motion sensing in some embodiments, such as odometery and/or distance measurement that may be produced by a vehicle or other mobile devices.

In the embodiment shown, camera unit 102, SPU 122, host processor 112, memory 114 and other components of device 100 may be coupled through bus 136, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 112 and memory 114.

As noted above, multiple layers of software may be employed as desired and stored in any combination of memory 114, memory 126, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 112 and SPU 122, for example, to transmit desired sensor processing tasks. Other embodiments may feature any desired division of processing between SPU 122 and host processor 112 as appropriate for the applications and/or hardware being employed. For example, lower level software layers may be provided in SPU 122 and an API layer implemented by host processor 112 may allow communication of the states of application programs as well as sensor commands. Some embodiments of API implementations in a motion detecting device are described in co-pending U.S. Pat. No. 8,952,832, incorporated by reference above.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an MPU may incorporate the sensor. The sensor or sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments the first substrate may be disposed laterally and electrically connected to the second substrate in a single semiconductor package.

As one example, the first substrate may be attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Depending on the context, motion data may refer to processed raw data, which may involve applying a sensor fusion algorithm or applying any other algorithm. In the case of a sensor fusion algorithm, data from one or more sensors may be combined to provide an orientation or orientation change of the device. In the described embodiments, an MPU may include processors, memory, control logic and sensors among structures.

As used herein, the term "captured image" refers to the pixels recorded by the image sensor of a digital camera, such as image sensor 106, without further stabilization adjustments. Therefore, to the extent OIS techniques are applied, the captured image may have been stabilized by any compensating changes in the relative positioning of lens 104 and image sensor 106, but no other processing of the recorded pixels has been performed to further stabilize the image.

Figure 2:
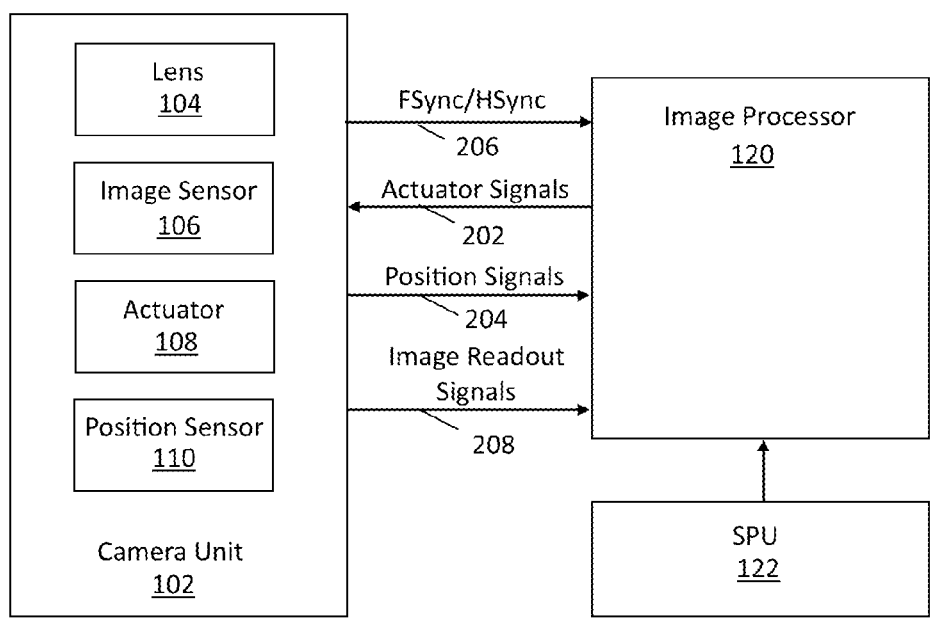
FIG. 2 is a schematic diagram showing communication between components of a mobile device during stabilization according to an embodiment.

Synchronization signals may be available during the row and frame readout of the sensors to help determine the relative positioning of lens 104 and image sensor 106 at the different stages of image recording. As one example, FIG. 2 schematically depicts the exchange of signals between image processor 120 and camera unit 102. In one aspect, image processor 120 may receive motion sensor data representing movement of device 100, such as from SPU 122 as shown. In other architectures, any suitable source of sensor data may be employed, including a dedicated OIS motion sensor assembly. Image processor 120 may employ the motion sensor data to determine an appropriate change in relative position between lens 104 and image sensor 106 to compensate for the detected movement. As such, image processor 120 sends actuator signals 202 configured to cause actuator 108 to produce the desired relative change in position. In this embodiment, position sensor 110 produces an output position signal 204 reflecting the relationship between lens 104 and image sensor 106 as feedback to verify that operation of actuator 108 has resulted in the desired change in relative position. Further, the HSync and FSync signals 206 correspond to row and frame information from image sensor 106, respectively. The image readout signals 208 transfer the data from the image sensor 106 to the image processor 120. Any one or combination of signals 202, 204, 206 and 208 may be used to estimate compensatory stabilization adjustments to the relative position between lens 104 and image sensor 106.

Figure 3:
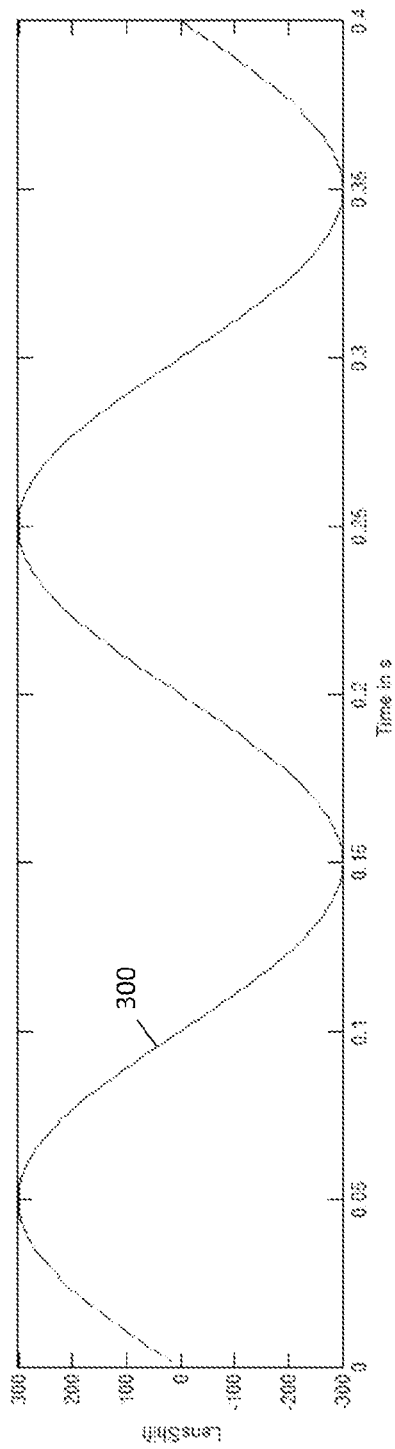
FIG. 3 is a schematic diagram showing conventional optical image stabilization during unintended motion.
Figure 4:
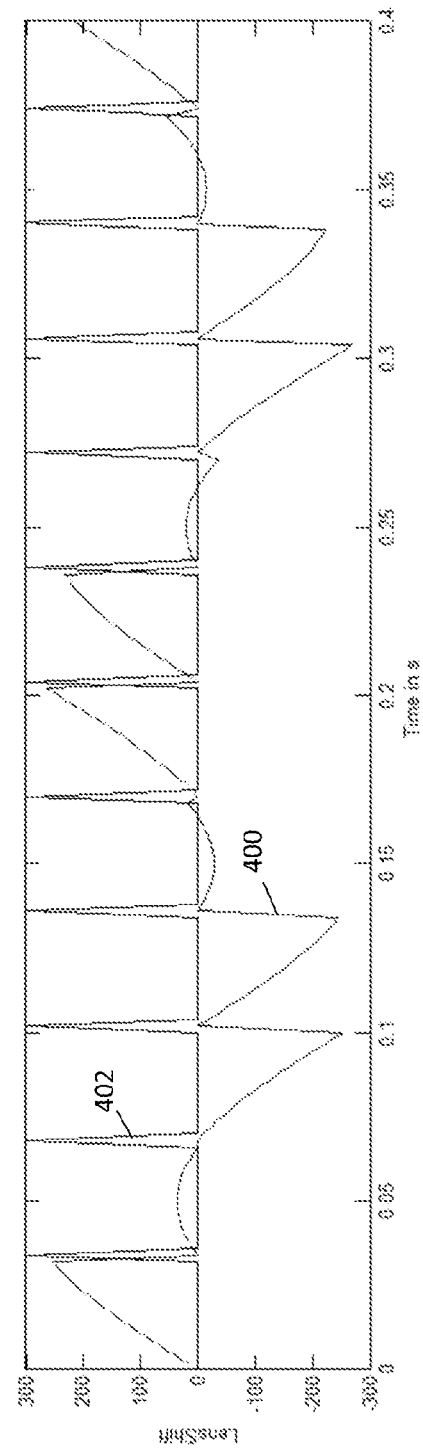
FIG. 4 is a schematic diagram showing optical image stabilization to compensate for unintended motion by periodically resetting relative lens and image sensor position according to an embodiment.

From the above discussion, OIS techniques may be employed during the capture of images to compensate for unintended movements of device 100 by generating a compensating relative movement between image sensor 106 and lens 104 in response to detected movement. Conventionally, such OIS techniques are limited by the displacement limitations of actuators 108. To help illustrate, FIG. 3 schematically depicts a compensatory lens shift as trace 300 that may be applied to accommodate a motion sinus of 5 Hz. Typical hand vibrations are in the range of 1-10 Hz, so this provides a good representation of the hand-held context. Even if actuator 108 can provide the required amount of displacement, at each peak and trough this limit may be met or exceeded and prevent further compensatory motion so that stabilization cannot be performed. Further, this simplified example does not account for sensor drift, which can cause the actuator limit to be exceeded more readily. Correspondingly, the techniques of this disclosure involve periodically resetting the relative lens and image sensor position at a frequency greater than the frequency of any unintended motion. In the context of this example, FIG. 4 schematically depicts the resetting of lens position in response to the FSYNC signal at 30 Hz, although it should be appreciated that any suitable synchronization signal may be used, including those used for other image processing tasks as well as signals generated specifically for this purpose. Specifically, lens shift is represented as trace 400 and FSYNC as trace 402. In the context of this example, a motion sinus of 5 Hz exhibits a period of 200 ms which requires the lens and image sensor position to transition from center to each maximum and minimum in one fourth that time, i.e. 50 ms. As shown, at each pulse of FSYNC 402, lens shift 400 is reset to a center position every 33 ms, which is sufficient to avoid reaching the motion limit of actuator 108 and compensatory motion is always possible. As another illustration, at an optical data rate of 60 Hz, lens and image sensor position may be reset every 17 ms. In some embodiments, actuator 108 may be configured so that the reset motion is faster than the standard compensation motion. To utilize FSYNC as the synchronization signal, the output from image sensor 102 may be coupled to SPU 122 through bus 136. Depending on the architecture, the FSYNC may also be directly coupled to an OIS controller if the OIS functionality is implemented within camera 102. Notably, SPU 122 may already receive FSYNC as an input for the purpose of applying EIS techniques.

Figure 5:
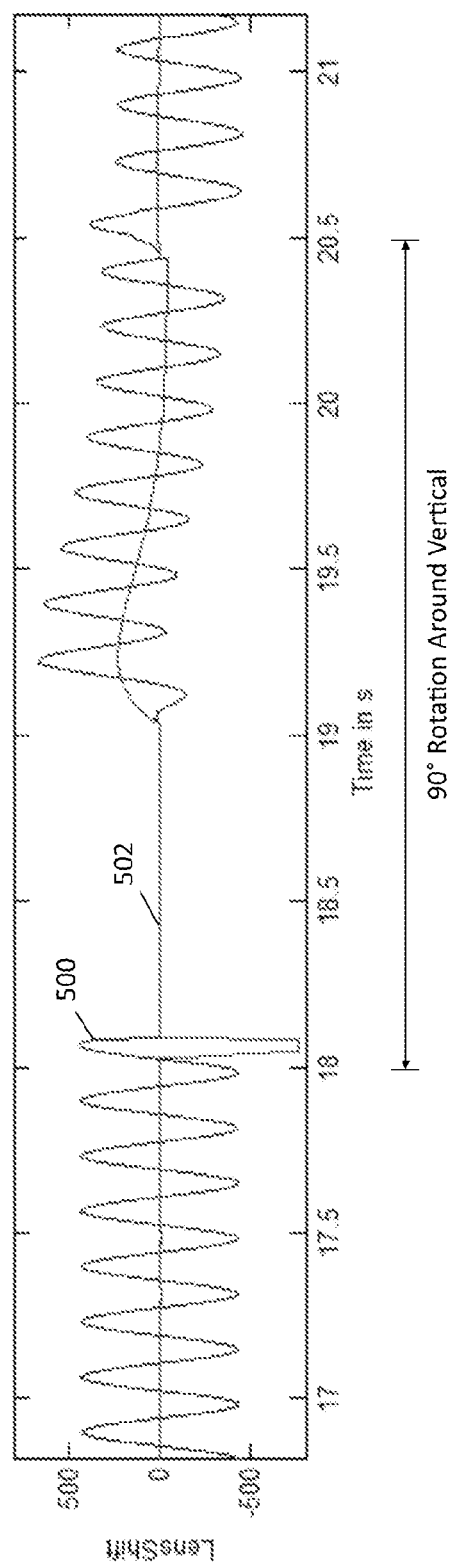
FIG. 5 is a schematic diagram showing conventional optical image stabilization to during relatively large motion.
Figure 6:
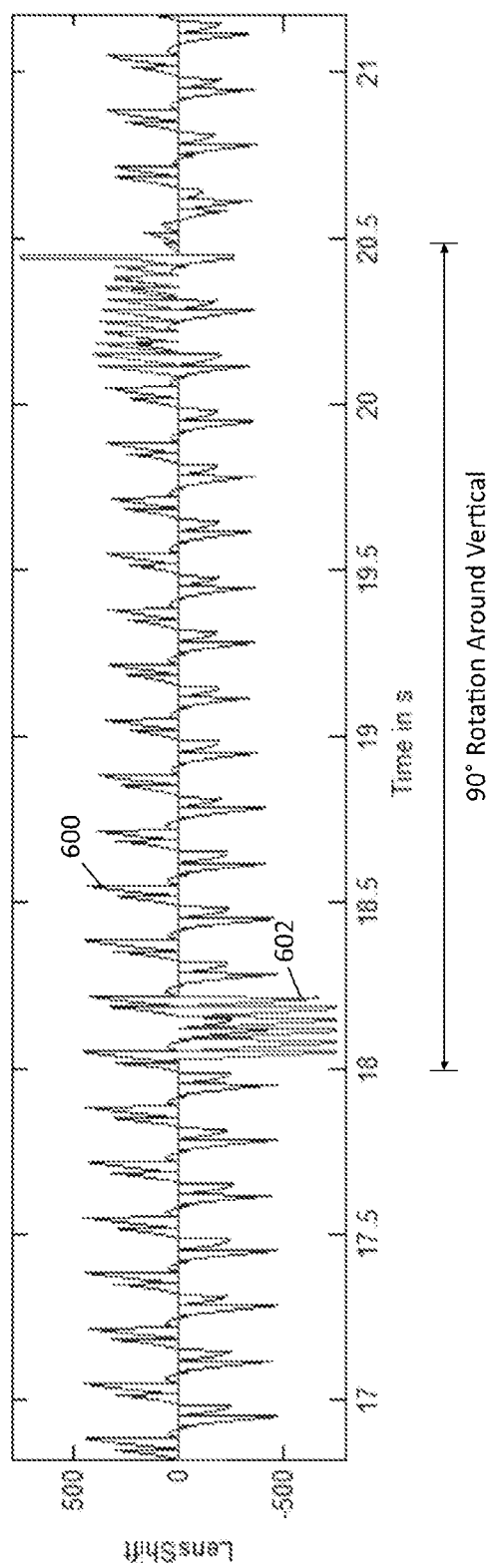
FIG. 6 is a schematic diagram showing optical image stabilization during relatively large motion by periodically resetting relative lens and image sensor position according to an embodiment.

As a further illustration, FIG. 5 schematically depicts a conventional OIS technique during a large motion. In this example, the lens shift on the x-axis is represented by trace 500 and the lens shift on the y-axis is represented by trace 502. The camera was rotated by 90° around vertical between the 18 and 20.5 s time stamps, with the x-axis lens shift 500 exhibiting a 5 Hz motion sinus to replicate hand vibration. As can be seen, OIS is interrupted during the rotation when the y-axis lens shift exceeds the motion limits. In contrast, FIG. 6 indicates the result of resetting the lens and image sensor position at the same 30 Hz rate shown in the previous example, with the lens shift on the x-axis is represented by trace 600 and the lens shift on the y-axis is represented by trace 602. As shown, resetting the lens shift results in the capability of continually providing OIS throughout the rotation, accommodating both the vibratory motion indicated on the x-axis lens shift 600 and the rotation motion indicated on the y-axis lens shift 602.

Further, it should also be appreciated that the periodic resetting of lens and image sensor position has the additional benefit of allowing recalibration of the sensors at each reset given that the reset position is known. Correspondingly, drift and other sensor errors are significantly mitigated. For example, accelerometer measurements are particularly susceptible to drift due to the double integration performed to estimate translation. Resetting the relative position of the lens and image sensor periodically reduces the chance that this drift will cause the motion limits of the actuators to be exceeded, The periodic resetting of lens shift significantly reduces the amount of time during which the accelerometer readings can drift and results in more accurate estimations of translation. Notably, the reset position may be chosen based at least in part on a filtering operation configured to compensate for the drift.

The techniques of this disclosure may also be applied to generating a composite still image from a plurality of captured images. As will be appreciated, one type of composite image may be a stitched together panorama that represents a greater field of view than any one of the captured images. In such applications, it may be desirable to predict the intended motion of the camera as it is panned to acquire the images. Correspondingly, rather than resetting to a center position, the relative position of the lens and image sensor can be reset to a desired position, such as so the expected motion center during capture of the next image matches the center position. Notably, the advantages discussed above regarding the compensation of smaller motions such as hand vibration as well as the compensation of larger motions, such as may result during running or other types of high activity can be realized.

A potential complication associated with the techniques of this disclosure relates to the electronic view finder function in which an image preview is displayed to the user continuously. In particular, the resetting of the lens shift may cause the center of each image preview to shift undesirably. However, this artifact can be mitigated using electronic image stabilization (EIS) techniques. For example, at least two image preview may be compared to determine whether one or more pixels have been translated by the resetting of the lens and image sensor position and/or the pixel translation calculated based on the known motion of the reset. As warranted, a subsequent image preview may be adjusted to minimize the amount of pixel shift to provide the user with a more stable image preview function without affecting the OIS compensation of images actually captured.

Figure 7:
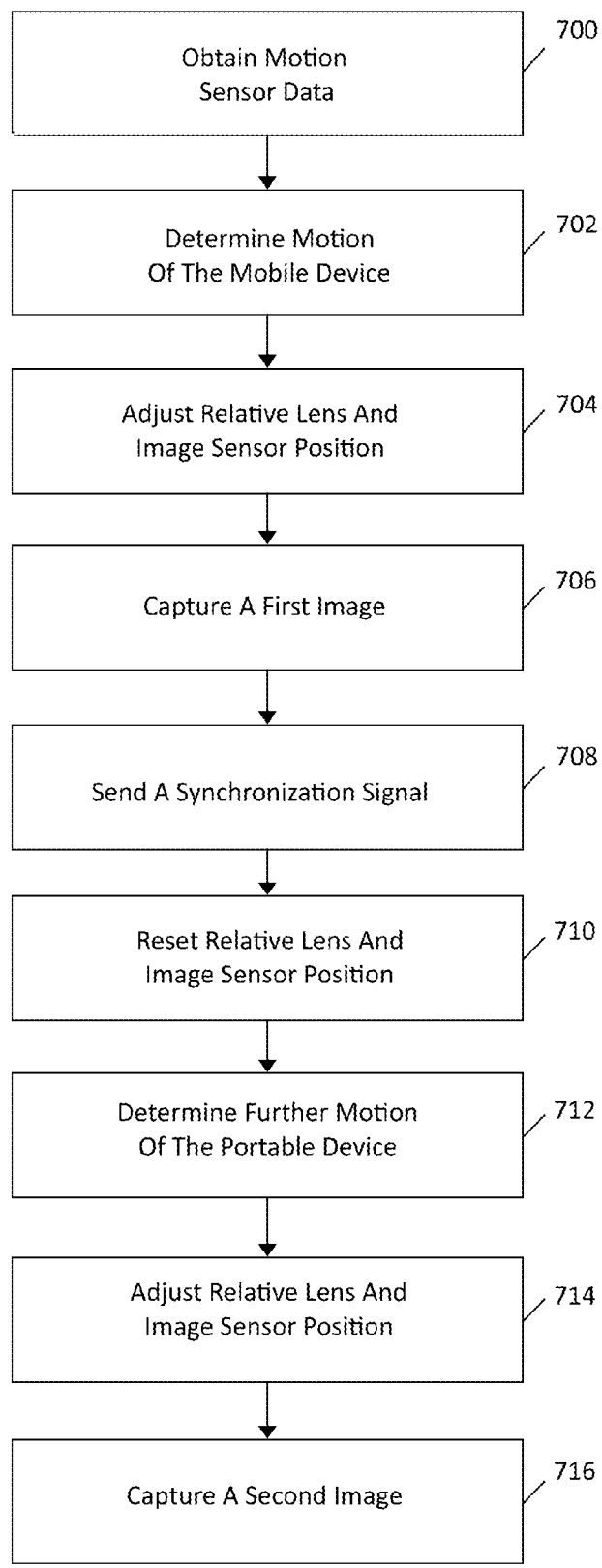
FIG. 7 schematically depicts an exemplary routine for capturing a plurality of stabilized images by periodically resetting relative lens and image sensor position according to an embodiment.

To help illustrate aspects of this disclosure, an exemplary routine for capturing a plurality of images with a mobile device is schematically depicted in the flowchart of FIG. 7. Beginning with 700, motion sensor data is obtained for the mobile device. In 702, a motion of the mobile device is determined from the obtained sensor data. Correspondingly, a relative position of an image sensor and a lens is adjusted in 704 based at least in part on the determined motion and a first image captured with the image sensor in 706. In 708, a synchronization signal is sent after the capture of the first image and the relative position of the lens and image sensor is reset in response to the synchronization signal in 710. Further motion of the mobile device is then determined in 712, based at least in part on obtained sensor data. Then, the relative position of the lens and the image sensor may be adjusted from the reset relative position in 714 and a second image captured in 716.

In one aspect, the first and second images may be part of a sequence of images captured at a sampling rate.

In one aspect, the synchronization signal may be sent periodically between each image capture of the sequence of images. Electronic image stabilization may be applied to align sequential captured images. The electronic image stabilization may be based at least in part on the sensor data.

In one aspect, adjusting the relative position of the lens and the image sensor may involve a recentering.

In one aspect, adjusting the relative position of the lens and the image sensor may involve selecting a new relative position of the lens and the image sensor based at least in part on previous motion of the mobile device. The first and second images may be incorporated into a panoramic image.

In one aspect, adjusting the relative position of the lens and the image sensor may include a translational motion correction.

In one aspect, determining further motion of the mobile device from the obtained motion sensor data may include obtaining motion sensor data at an epoch corresponding to the synchronization signal.

In one aspect, the obtained sensor data may be data from an inertial sensor assembly associated with the mobile device.

In one aspect, the obtained sensor data may be non-inertial motion sensor data.

As noted above, this disclosure may also include a mobile device with an image sensor, a lens, a motion sensor and at least one processor configured to receive data from the motion sensor. The at least one processor may be configured to determine a motion of the mobile device from the motion sensor data and adjust a relative position of the lens and the image sensor based on the determined motion. The at least one processor may also be configured to capture a first image with the image sensor. The relative position of the lens and the image sensor may be reset in response to a synchronization signal sent after capturing the first image. The at least one processor may determine further motion of the mobile device from the motion sensor data and adjust the relative position of the lens and the image sensor from the reset relative position based on the determined further motion so that a second image with the image sensor.

In one aspect, the first and second images may be part of a sequence of images captured at a sampling rate In one aspect, the synchronization signal may be sent periodically between each image capture of the sequence of images. At least one processor may be configured to apply electronic image stabilization to align sequential captured images. The electronic image stabilization may be based at least in part on the sensor data.

In one aspect, wherein at least one processor is configured to reset the relative position of the lens and the image sensor by recentering.

In one aspect, at least one processor may be configured to reset the relative position of the lens and the image sensor by selecting a new relative position of the lens and the image sensor based at least in part on previous motion of the mobile device.

In one aspect, the motion sensor may be an inertial sensor assembly. The inertial sensor assembly may have an accelerometer and the at least one processor may be configured to adjust the relative position of the lens and the image sensor using a translational motion correction.

In one aspect, the motion sensor may be a non-inertial motion sensor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for capturing a plurality of images with a mobile device, the method comprising the sequence of:
   obtaining motion sensor data for the mobile device;
   determining a motion of the mobile device from the sensor data;
   adjusting a relative position of an image sensor and a lens based on the determined motion;
   capturing a first image with the image sensor;
   sending a synchronization signal after capturing the first image;
   resetting the relative position of the lens and the image sensor in response to the synchronization signal, wherein resetting the relative position comprises returning to a known position;
   recalibrating at least one sensor from which the motion sensor data is obtained based at least in part on the reset relative position;
   determining further motion of the mobile device from the sensor data;
   adjusting the relative position of the lens and the image sensor from the reset relative position based on the determined further motion; and
   capturing a second image with the image sensor.

2. The method of claim 1, wherein the first and second images are part of a sequence of images captured at a sampling rate.

3. The method of claim 2, further comprising sending the synchronization signal sent periodically between each image capture of the sequence of images.

4. The method of claim 2, further comprising applying electronic image stabilization to align sequential captured images.

5. The method of claim 4, wherein the electronic image stabilization is based at least in part on the sensor data.

6. The method of claim 1, wherein resetting the relative position of the lens and the image sensor comprises a recentering.

7. The method of claim 1, wherein resetting the relative position of the lens and the image sensor comprises selecting a new relative position of the lens and the image sensor based at least in part on previous motion of the mobile device.

8. The method of claim 7, wherein the first and second images are incorporated into a panoramic image.

9. The method of claim 1, wherein adjusting the relative position of the lens and the image sensor comprises a translational motion correction.

10. The method of claim 1, wherein determining further motion of the mobile device from the obtained motion sensor data comprises obtaining sensor data at an epoch corresponding to the synchronization signal.

11. The method of claim 1, wherein the obtained sensor data comprises data from an inertial sensor assembly associated with the mobile device.

12. The method of claim 1, wherein the obtained sensor data comprises non-inertial motion sensor data.

13. A mobile device comprising:
   an image sensor;
   a lens;
   a motion sensor; and
   at least one processor configured to receive data from the motion sensor; wherein the at least one processor is configured to:
   determine a motion of the mobile device from the motion sensor data;
   adjust a relative position of the lens and the image sensor based on the determined motion;
   capture a first image with the image sensor;
   reset the relative position of the lens and the image sensor in response to a synchronization signal sent after capturing the first image, wherein resetting the relative position comprises returning to a known position;
   recalibrate the motion sensor based at least in part on the reset relative position;
   determine further motion of the mobile device from the sensor data;
   adjust the relative position of the lens and the image sensor from the reset relative position based on the determined further motion; and
   capture a second image with the image sensor.

14. The mobile device of claim 13, wherein the first and second images are part of a sequence of images captured at a sampling rate.

15. The mobile device of claim 13, wherein the synchronization signal is sent periodically between each image capture of the sequence of images.

16. The mobile device of claim 15, wherein at least one processor is configured to apply electronic image stabilization to align sequential captured images.

17. The mobile device of claim 16, wherein the electronic image stabilization is based at least in part on the motion sensor data.

18. The mobile device of claim 13, wherein the at least one processor is configured to reset the relative position of the lens and the image sensor by recentering.

19. The mobile device of claim 13, wherein the at least one processor is configured to reset the relative position of the lens and the image sensor by selecting a new relative position of the lens and the image sensor based at least in part on previous motion of the mobile device.

20. The mobile device of claim 13, wherein the motion sensor comprises an inertial sensor assembly.

21. The mobile device of claim 20, wherein the inertial sensor assembly comprises an accelerometer and wherein the at least one processor is configured to adjust the relative position of the lens and the image sensor using a translational motion correction.

22. The mobile device of claim 13, wherein the motion sensor comprises a non-inertial motion sensor.

* * * * *